(12) United States Patent
Shen et al.

(10) Patent No.: US 10,708,481 B2
(45) Date of Patent: *Jul. 7, 2020

(54) CAMERA MODULE AND PHOTOSENSITIVE ASSEMBLY THEREOF

(71) Applicant: NANCHANG O-FILM OPTICAL-ELECTRONIC TECH CO., LTD., Nanchang (CN)

(72) Inventors: Chengzhe Shen, Nanchang (CN); Jun Feng, Nanchang (CN); Shumin Zhu, Nanchang (CN); Shengyun Zhang, Nanchang (CN); Wenhua Shuai, Nanchang (CN); Dong Tang, Nanchang (CN)

(73) Assignee: NANCHANG O-FILM OPTICAL-ELECTRONIC TECH CO., LTD., Nanchang (CN)

( * ) Notice: Subject to any disclaimer, the term of this patent is extended or adjusted under 35 U.S.C. 154(b) by 41 days.

This patent is subject to a terminal disclaimer.

(21) Appl. No.: 16/132,372

(22) Filed: Sep. 15, 2018

(65) Prior Publication Data

US 2019/0089883 A1 Mar. 21, 2019

(30) Foreign Application Priority Data

Sep. 15, 2017 (CN) .......................... 2017 1 0853873

(51) Int. Cl.
*H04N 5/225* (2006.01)

(52) U.S. Cl.
CPC ......... *H04N 5/2257* (2013.01); *H04N 5/2253* (2013.01); *H04N 5/2254* (2013.01)

(58) Field of Classification Search
CPC ... H04N 5/2253; H04N 5/2254; H04N 5/2257
(Continued)

(56) References Cited

U.S. PATENT DOCUMENTS

2006/0202293 A1* 9/2006 Bogdan .................. G02B 7/021
257/432
2016/0351607 A1* 12/2016 Liu .................... H01L 27/14618
(Continued)

OTHER PUBLICATIONS

U.S. Office Action dated Oct. 7 2019, issued on U.S. Appl. No. 16/132,295 in the name of Vanchang O-Film Optical-Electronic Tech Co., Ltd.
(Continued)

*Primary Examiner* — Anthony J Daniels
(74) *Attorney, Agent, or Firm* — Franklin & Associates International Inc; Matthew F. Lambrinos

(57) ABSTRACT

The present disclosure relates to a camera module and a photosensitive assembly thereof. The photosensitive assembly includes a circuit board, a photosensitive chip and a packaging body. The photosensitive chip is connected to the circuit board, and includes a photosensitive region and a non-photosensitive region surrounding the photosensitive region. The packaging body is formed on the circuit board and a portion of the non-photosensitive region of the photosensitive chip. The packaging body includes a top surface away from the photosensitive chip and an inner side surface connecting the top surface to the non-photosensitive region. A portion of the inner side surface adjacent to the top surface is a cambered surface, and the cambered surface has a larger surface area than an inclined plane, thus the cambered surface can carry more adhesive. In this way, it is possible to effectively prevent the adhesive from flowing to the photosensitive region of the photosensitive chip.

8 Claims, 3 Drawing Sheets

(58) Field of Classification Search
USPC .......................................................... 348/374
See application file for complete search history.

(56) References Cited

U.S. PATENT DOCUMENTS

| | | | |
|---|---|---|---|
| 2018/0007244 A1 | 1/2018 | Wang et al. | |
| 2018/0035028 A1* | 2/2018 | Wang | ................ G02B 19/0076 |
| 2018/0332245 A1* | 11/2018 | Mishima | ................ H01L 23/28 |
| 2019/0086771 A1 | 3/2019 | Shen et al. | |
| 2019/0088698 A1 | 3/2019 | Shen et al. | |
| 2019/0088699 A1 | 3/2019 | Shen et al. | |
| 2019/0089881 A1 | 3/2019 | Shen et al. | |
| 2019/0089882 A1 | 3/2019 | Shen et al. | |
| 2019/0089883 A1 | 3/2019 | Shen et al. | |
| 2019/0089884 A1 | 3/2019 | Shen et al. | |
| 2019/0089885 A1 | 3/2019 | Shen et al. | |
| 2019/0148429 A1 | 5/2019 | Wang et al. | |
| 2019/0165019 A1 | 5/2019 | Wang et al. | |

OTHER PUBLICATIONS

Non-Final Office Action dated Aug. 7, 2019 issued on U.S. Appl. No. 16/132,260 to Nanchang O-Film Optical-Electronic Tech Co., Ltd.

* cited by examiner

… (1)

CAMERA MODULE AND PHOTOSENSITIVE ASSEMBLY THEREOF

CROSS-REFERENCE TO RELATED APPLICATIONS

This application claims priority to Chinese Patent Application No.201710853873.0, entitled "CAMERA MODULE AND PHOTOSENSITIVE ASSEMBLY THEREOF" filed Sep. 15, 2017, the contents of which is expressly incorporated herein by reference in its entirety.

TECHNICAL FIELD

The present disclosure relates to the field of camera modules, and more particularly, to a camera module and a photosensitive assembly thereof.

BACKGROUND

With the rapid development of various smart devices, smart devices integrated with camera modules are developing towards thinner and lighter, while improving the imaging quality. The imaging quality is improved, with the result that both of the sizes and quantities of electronic components are getting larger, and the area of the photosensitive chip significantly affecting the imaging quality is also increasing. This causes more assembling difficulty of the camera module and larger sizes of the camera modules. Therefore, the lightening and thinning of the camera module is greatly limited, thereby limiting the size of the smart device provided with the camera module.

Generally, during the manufacturing of a camera module, a circuit board and a photosensitive chip are manufactured separately at first. Then the photosensitive chip is bonded to the circuit board, and finally the circuit board and the photosensitive chip are packaged together by a packaging body. Typically, a packaging body is made by an injection molding process, in which the top surface of the packaging body may be warped up by a molding device in a demolding step. This may reduce the imaging quality of the camera module.

SUMMARY

The present disclosure is intended to provide a high quality camera module and a photosensitive assembly thereof.

A photosensitive assembly is provided, including:
a circuit board;
a photosensitive chip connected to the circuit board, the photosensitive chip including a photosensitive region and a non-photosensitive region surrounding the photosensitive region; and
a packaging body formed on the circuit board and a portion of the non-photosensitive region of the photosensitive chip, the packaging body including a top surface away from the photosensitive chip and an inner side surface connecting the top surface and the non-photosensitive region, wherein a portion of the inner side surface adjacent to the top surface is a cambered surface.

In the above-mentioned photosensitive assembly, the portion of the inner side surface adjacent to the top surface of the packaging body is the cambered surface. When the support device and the packaging body are bonded, the redundant adhesive can flow inward onto the cambered surface. The cambered surface has higher resistance to the flow of the adhesive than an inclined plane, which can reduce the flow velocity of the adhesive, so that the adhesive can be deposited on the cambered surface. Furthermore, the cambered surface has a larger surface area than the inclined plane and can carry more adhesive. In this way, it is possible to effectively prevent the adhesive from flowing to the photosensitive region of the photosensitive chip.

In one embodiment, the cambered surface is a convex cambered surface. Compared with the inner side surface perpendicular to the photosensitive chip and passing through an end of the cambered surface away from the top surface, the convex cambered surface can reduce the material requirement of the packaging body, in addition to facilitating the demolding of the molding device of the packaging body.

In one embodiment, the convex cambered surface is a circular cambered surface with a radius ranged from 10 to 100 μm. The above-mentioned radius configuration of the convex circular cambered surface takes into consideration both the convenience of the demolding of the packaging body and the reduction of the material requirement of the packaging body.

In one embodiment, the radius of the circular cambered surface ranges from 30 to 80 μm.

In one embodiment, the radius of the circular cambered surface ranges from 40 to 60 μm.

In one embodiment, the inner side surface further includes an extended surface connecting the cambered surface to the non-photosensitive region. The extended surface can enhance the structural strength of the packaging body.

In one embodiment, the extended surface is perpendicular to the top surface, or an angle between the extended surface and the top surface is an obtuse angle. The extended surface is perpendicular to the top surface, so that the structural strength of the packaging body can be enhanced. The angle between the extended surface and the top surface is an obtuse angle, so that it is more conducive to demold the molding device of the packaging body, and reduce the amount of reflected light of the incident light reflected to the photosensitive region of the photosensitive chip via the extended surface, thereby avoiding interference with the imaging effect and improving the imaging quality.

In one embodiment, the top surface is parallel to an upper surface of the photosensitive chip, and a depth between the top surface and the upper surface of the photosensitive chip is 200 to 300 μm. The above-mentioned depth design can meet both packaging requirements and miniaturization design of the photosensitive assembly.

In one embodiment, it further includes wires connecting the photosensitive chip and the circuit board, the wires being capsuled in the packaging body. The wires are capsuled in the packaging body to prevent the wires from moving. Also, the wires are in a scaled environment, thus the wires hardly contact the moisture in the air, thereby extending the service life of the wires.

A camera module is also provided, including:
any one of the above-mentioned photosensitive assemblies; and
a lens assembly arranged on the photosensitive assembly and located on a photosensitive path of the photosensitive chip.

Since the photosensitive assembly is firmer and more easily to demold, the firmness of the camera module including the photosensitive assembly is also enhanced, and the production cost is also reduced.

DETAILED DESCRIPTION

For the convenience of understanding the present disclosure, embodiments of the disclosure are described more fully hereinafter with reference to the accompanying drawings. Preferable embodiments are presented in the accompanying drawings. However, the disclosure may be embodied in many different forms and is not limited to the embodiments described herein Rather, these embodiments are provided so that the understanding of the disclosure of the present disclosure will be more thorough.

It should be understood that when an element is referred to as "fixed to" another element, it can be directly on the other element or an intervening element may also be present. When an element is referred to as being "connected" to another element, it can be directly connected to another element or an intervening element may also be present. The terms "vertical", "horizontal", "left", "right" and the like are used herein for an illustrative purpose only.

All technical and scientific terms used herein have the same meaning as commonly understood by one of ordinary skill in the art, unless otherwise defined. The terms used herein is for the purpose of describing embodiments only and is not intended to limit the present disclosure. As used herein, the term "and/or" includes any and all combinations of one or more of the associated listed items.

Figure 1:
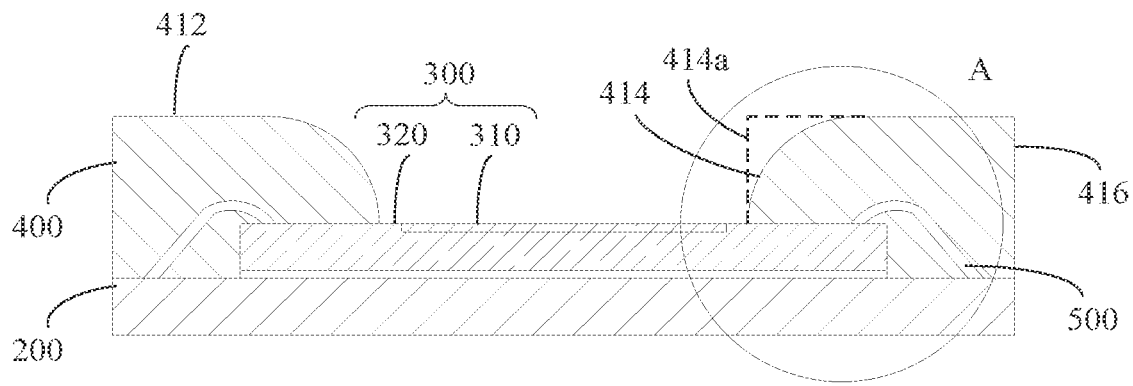
FIG. 1 is a schematic view of a photosensitive assembly according to a first embodiment of the present disclosure.
Figure 2:
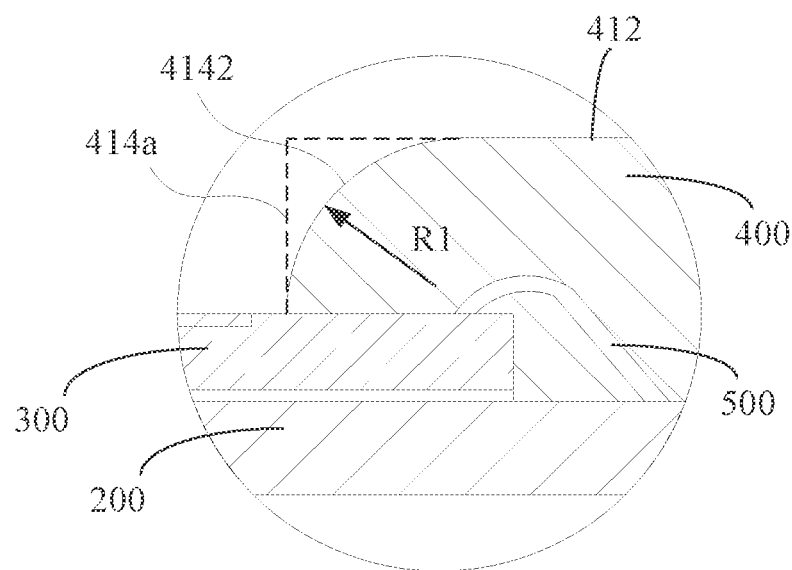
FIG. 2 is an enlarged view of a portion A in the photosensitive assembly of FIG. 1.

As shown in FIGS. 1 and 2, a photosensitive assembly 102 according to one embodiment includes a circuit board 200, a photosensitive chip 300, and a packaging body 400. The circuit board 200 may be a rigid circuit board, such as a ceramic circuit board, or may be a rigid-flexible circuit board or a flexible circuit board. If the circuit board 200 is the flexible circuit board, a reinforcing board (not shown) may be arranged on a side of the circuit board 200 away from the photosensitive chip 300 to reinforce the circuit board 200, thereby improving the integral structural strength of the photosensitive assembly 102.

The photosensitive chip 300 is connected to the circuit board 200. The photosensitive chip 300 includes a photosensitive region 310 and a non-photosensitive region 320 surrounding the photosensitive region 310. The photosensitive region 310 is mainly made of a semiconductor material having photosensitive characteristics. A chemical change takes place in the photosensitive region 310 when the photosensitive region 310 is irradiated with light, and the photosensitive region 310 converts the light into an electrical signal, thereby realizing the transformation of the photoelectric signal, and finally completing the imaging.

The packaging body 400 is formed on the circuit board 200 and a portion of the non-photosensitive region 320 of the photosensitive chip 300. The packaging body 400 includes a top surface 412 away from the photosensitive chip 300, and an inner side surface 414 connected between the top surface 412 and the non-photosensitive region 320. A portion of the inner side surface 414 adjacent to the top surface 412 is a cambered surface 4142.

In this embodiment, the non-photosensitive region 320 is partially embedded in the packaging body 400, so that the entire photosensitive region 310 can be used to sense light, thereby ensuring the largest photosensitive area of the photosensitive assembly 102. Moreover, compared with the packaging body 400 covering the entire non-photosensitive regions 320, the present disclosure can not only reduce the volume of the packaging body 400, but also reserve a portion of the non-photosensitive regions 320 to receive foreign materials such as package resin. This can avoid reducing the imaging quality caused by the package resin or the like flowing into the photosensitive region 310 during the packaging process.

First, for the photosensitive assembly 102 in this embodiment, the portion of the inner side surface 414 adjacent to the top surface 412 of the packaging body 400 is the cambered surface 4142. When a support device and the packaging body 400 are bonded, the redundant adhesive can flow inward onto the cambered surface 4142. The cambered surface has higher resistance to the flow of the adhesive than the inclined plane, which can reduce the flow velocity of the adhesive. Thus the adhesive can be deposited on the cambered surface. Furthermore, the cambered surface has a larger surface area than the inclined plane, thereby carrying more adhesive. In this way, it is possible to effectively prevent the adhesive from flowing to the photosensitive region of the photosensitive chip.

Next, the packaging body 400 extends to the non-photosensitive region 320 of the photosensitive chip 300, so that the photosensitive chip 300 is fixed on the circuit board 200 by molding. While forming the packaging body 400, the connection of the photosensitive chip 300 to the circuit board 200 is completed, thereby enhancing the firmness of the connection between the photosensitive chip 300 and the circuit board 200.

Moreover, compared with the conventional packaging body spaced with the photosensitive chip, the packaging body 400 extending to the non-photosensitive region 320 of the photosensitive chip 300 can increase the contact area between the packaging body 400 and the photosensitive chip 300. This can also enhance the firmness of the connection between the packaging body 400 and the circuit board 200 and between the packaging body 400 and the photosensitive chip 300.

It is worth mentioning that the packaging body 400 is formed on the circuit board 200 and the non-photosensitive region 320 of the photosensitive chip 300 by means of molding. For example, the packaging body 400 is formed by molding the circuit board 200 and the photosensitive chip 300 in an insert molding process by using an injection molding machine. The finished packaging body 400 is firmly connected to the circuit board 200 and the photosensitive chip 300. Each of the bonding forces between the packaging body 400 and the circuit board 200 and between the packaging body 400 and the photosensitive chip 300 is much larger than the bonding force generated through the traditional way of bonding by adhesive layers. Specifically, the material for forming the packaging body 400 by an injection molding process may be nylon, LCP (Liquid Crystal Polymer) or PP (Polypropylene), etc. It will be understood by those skilled in the art that the foregoing alternative manufacturing methods and alternative materials are merely illustrative of the manner in which the disclosure can be implemented and are not intended to limit the disclosure.

In this embodiment, the cambered surface 4142 is a convex circular cambered surface. That is, the cambered surface 4142 protrudes from an inner side surface 414 away from an outer side surface 416 of the packaging body 400. Compared with an inner side surface 414a (an imaginary inner side surface) perpendicular to the photosensitive chip 300 and passing through an end of the cambered surface 4142 away from the top surface 412, it can reduce the material requirement of the packaging body 400 by adopting the convex circular cambered surface.

Furthermore, the cambered surface 4142 is tangent to the top surface 412 to ensure that the inner side surface 414 and the top surface 412 are smoothly connected. When the support device and the packaging body are bonded together, the redundant adhesive can flow inward onto the cambered surface 4142. The cambered surface has higher resistance to the flow of the adhesive than the inclined plane, which can reduce the flow velocity of the adhesive. Thus the adhesive can be deposited on the cambered surface. Furthermore, the cambered surface has a larger surface area than the inclined plane, thereby carrying more adhesive. In this way, it is possible to effectively prevent the adhesive from flowing to the photosensitive region of the photosensitive chip.

In one embodiment, the radius R1 of the convex circular cambered surface ranges from 10 to 100 µm.

In one embodiment, the radius R1 of the convex circular cambered surface ranges from 30 to 80 µm.

In one embodiment, the radius R1 of the convex circular cambered surface ranges from 40 to 60 µm.

The radius configuration of the convex circular cambered surface takes into consideration both the convenience of the demolding of the packaging body and the reduction of the material requirement of the packaging body. If R1 is loo large, the cambered surface 4142 is almost coplanar with the top surface 412, which does not reduce the material requirement of the packaging body 400. If R1 is too small, the cambered surface 4142 is nearly perpendicular to the photosensitive chip 300, which is disadvantageous for the demolding of the packaging body 400.

As shown in FIGS 3-6, the inner side surface 414 further includes an extended surface 4144 connecting between the cambered surface 4142 and the non-photosensitive region 320.

Figure 3:
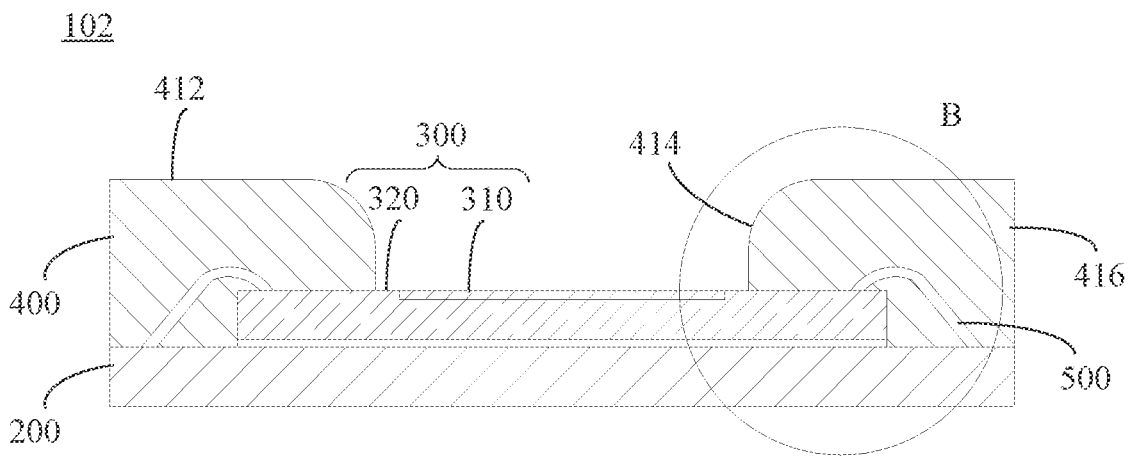
FIG. 3 is a schematic view of a photosensitive assembly according to a second embodiment of the present disclosure.
Figure 4:
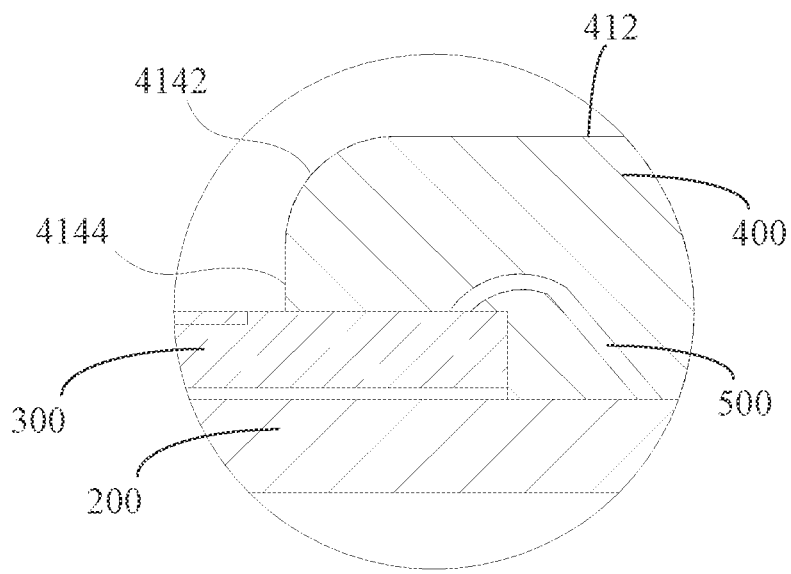
FIG. 4 is an enlarged view of a portion B in the photosensitive assembly of FIG. 3.

In one embodiment, as shown in FIGS. 3 and 4, the extended surface 4144 is perpendicular to the top surface 412, thereby increasing the structural strength of the packaging body 400.

Figure 5:
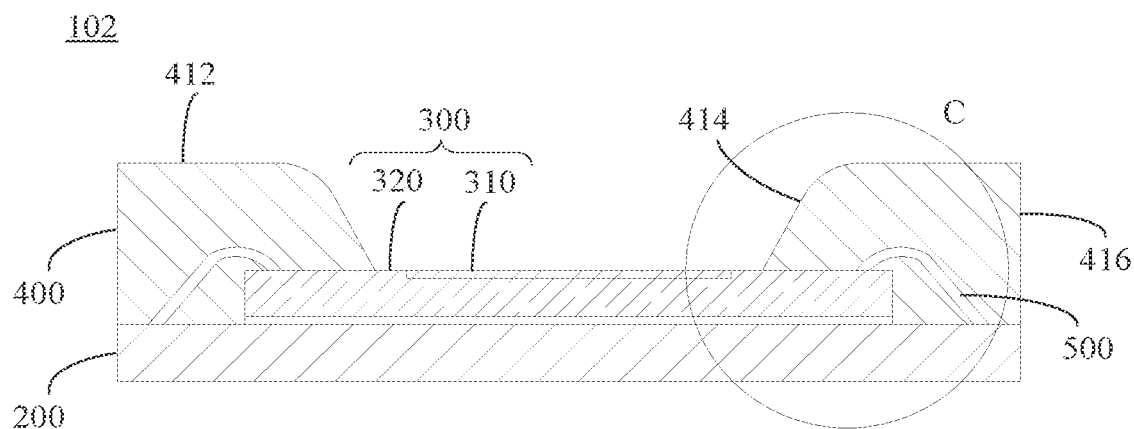
FIG. 5 is a schematic view a photosensitive assembly according to a third embodiment of the present disclosure.
Figure 6:
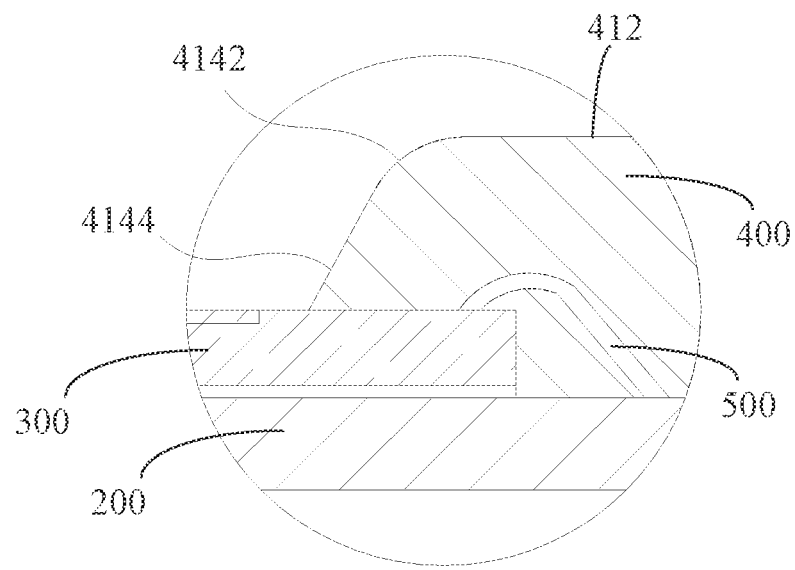
FIG. 6 is an enlarged view of a portion C in the photosensitive assembly of FIG. 5.

In one embodiment, as shown in FIGS. 5 and 6, the angle between the extended surface 4144 and the top surface 412 is an obtuse angle. That is, the extension surface 4144 is inclined toward the outer side surface 416. This can not only be more advantageous for the demolding of the molding device of the packaging body 400, but also reduce the amount of reflected light of the incident light reflected to the photosensitive region of the photosensitive chip via the extended surface, thereby avoiding interference with the imaging effect and improving the imaging quality.

Furthermore, in either of the embodiments shown in FIG. 3 and FIG. 5, the extended surface 4144 is tangent to the cambered surface 4142. That is, the extended surface 4144 is smoothly connected to the cambered surface 4142 to facilitate the demolding of the molding device of the packaging body 400, thereby preventing the molding device from damaging the packaging body 400.

In addition, in order to further facilitate the demolding of the molding device of the packaging body 400, a concave cambered surface may also be provided on the extended surface 4144 adjacent to the non-photosensitive region 320. The concave cambered surface is provided to be connected to both the extension surface 4144 and the non-photosensitive region 320 smoothly. The concave cambered surface can increase the area of the packaging body 400 covering the photosensitive chip 300, and increase the firmness of the connection between the packaging body 400 and the photosensitive chip 300.

In one embodiment, the top surface 412 is parallel to the upper surface of the photosensitive chip 300, and the vertical distance H (depth) between the top surface 412 and the upper surface of the photosensitive chip 300 ranges from 200 to 300 µm. The upper surface in this embodiment means a surface of the photosensitive chip 300 facing away from the circuit board 200. If the depth H of the packaging body 400 relative to the upper surface of the photosensitive chip 300 is smaller than 200 µm. the process of packaging the photosensitive chip 300 and other electronic elements on the circuit board 200 cannot be easily executed. If the depth H of the packaging body 400 relative to the upper surface of the photosensitive chip 300 is larger than 300 µm, the depth of the camera module is markedly increased. This makes it difficult to apply the camera module to a slim electronic device such as a mobile phone. That is, the above-mentioned design of the depth H can meet both packaging requirements and miniaturization design.

In one embodiment, the photosensitive assembly 102 further includes wires 500 connecting the photosensitive chip 300 to the circuit board 200. The wires 500 are capsuled in the packaging body 400 That is, the wires 500 are completely housed in the packaging body 400. A material of the wires 500 may be selected from a group consisting of gold, copper, aluminum, silver and etc. The wires 500 are capsuled by the packaging body 400 to prevent the wires 500 from moving. Also, the wires 500 are in a sealed environment, thus the wires 500 hardly contact the moisture in the air, thereby extending the service life of the wires 500.

The present embodiment further provides a camera module, including the above-mentioned photosensitive assembly 102 and a lens assembly. The lens assembly is arranged above the photosensitive assembly 102 and aligned with the photosensitive chip 300 directly.

When a fixed focus lens is required, the lens assembly includes a lens located above the top surface 416. When a zoom lens is required, the lens assembly includes a lens, and a voice coil motor sleeved on the lens and located on the top surface 416. Light is transmitted to the photosensitive region 310 of the photosensitive chip 300 through the lens, and the photosensitive chip 300 converts an optical signal into an electrical signal.

The camera module includes a firmer photosensitive assembly 102, so that the camera module also becomes firmer. Since the success rate of the demolding of the molding device of the packaging body 400 on the photosensitive assembly 102 is higher, the production cost of the camera module is also reduced.

The technical features of the above-described embodiments may be combined arbitrarily. To simplify the description, all the possible combinations of the technical features in the above embodiments are not described. However, all of the combinations of these technical features should be considered as within the scope of the disclosure, as long as such combinations do not contradict with each other.

The above-described embodiments merely represent several embodiments of the present disclosure, and the description thereof is more specific and detailed, but it should not be construed as limiting the scope of the present disclosure. It should be noted that, for those skilled in the art, several variations and improvements may be made without departing from the concept of the present disclosure, and these are all within the protection scope of the present disclosure. Therefore, the scope of protection of the present disclosure shall be subject to the appended claims.

What is claimed is:

1. A photosensitive assembly, comprising:
   a circuit board;
   a photosensitive chip connected to the circuit board, the photosensitive chip comprising a photosensitive region and a non-photosensitive region surrounding the photosensitive region; and
   a packaging body formed on the circuit board and a portion of the non-photosensitive region of the photosensitive chip, the packaging body comprising a top surface away from the photosensitive chip and an inner side surface connecting the top surface and the non-photosensitive region, wherein a portion of the inner side surface adjacent to the top surface is a cambered surface;
   wherein the cambered surface is a convex cambered surface;
   wherein the convex cambered surface is a circular cambered surface with a radius ranged from 10 to 100 μm.

2. The photosensitive assembly of claim 1, wherein the radius of the circular cambered surface ranges from 30 to 80 μm.

3. The photosensitive assembly of claim 1, wherein the radius of the circular cambered surface ranges from 40 to 60 μm.

4. The photosensitive assembly of claim 1, wherein the inner side surface further comprises an extended surface connecting the cambered surface to the non-photosensitive region.

5. The photosensitive assembly of claim 4, wherein the extended surface is perpendicular to the top surface, or an angle between the extended surface and the top surface is an obtuse angle.

6. The photosensitive assembly of claim 1, wherein the top surface is parallel to an upper surface of the photosensitive chip, and a depth between the top surface and the upper surface of the photosensitive chip ranges from 200 to 300 μm.

7. The photosensitive assembly of claim 1, further comprising wires connecting the photosensitive chip to the circuit board, the wires being capsuled in the packaging body.

8. A camera module, comprising:
   a photosensitive assembly according to claim 1; and
   a lens assembly arranged on the photosensitive assembly and located on a photosensitive path of the photosensitive chip.

* * * * *